United States Patent [19]
Bell

[11] Patent Number: 5,755,453
[45] Date of Patent: May 26, 1998

[54] TRAILER GUIDE WITH AN ELEVATABLE TUBE FOR VIEWING PURPOSES

[76] Inventor: William C. Bell, 591 N. Walnut, Manteno, Ill. 60950

[21] Appl. No.: 614,673

[22] Filed: Mar. 13, 1996

[51] Int. Cl.$^6$ ........................................ B60D 1/40
[52] U.S. Cl. .............................. 280/477; 116/28 R
[58] Field of Search ............ 280/477 O; 33/264; 116/28 R; 296/181

[56] References Cited

U.S. PATENT DOCUMENTS

| | | | |
|---|---|---|---|
| 3,867,898 | 2/1975 | Lakamp | 116/28 R |
| 4,958,436 | 9/1990 | Tusche | 33/264 |
| 4,986,571 | 1/1991 | Godbersen | 296/181 X |
| 5,035,441 | 7/1991 | Murray | 280/477 |

*Primary Examiner*—Christopher P. Ellis

[57] ABSTRACT

Apparatus for use with a boat or similar type trailer comprising a bracket with a forwardly extending portion and a rearwardly extending portion securable to the framework of a trailer adjacent to the rear. A pivot pin is provided and has a fixed end secured to the bracket. A resilient C-shaped clip with a central extent and a front opening is secured to the forwardly extending portion of the bracket. Another resilient C-shaped clip with a central extent and a front opening is secured to the rearwardly extending portion of the bracket. A rigid elongated tube is provided and has an aperture adjacent to its lower end pivotally received on the pin and adapted to be moved from a lower horizontal orientation to a raised vertical orientation. The pole is adapted to be received within the clip in either orientation and retained in such orientation until pulled upwardly by an external force applied as by a user, or pushed downwardly by an external force applied as by boat or similar device.

4 Claims, 2 Drawing Sheets

TRAILER GUIDE WITH AN ELEVATABLE TUBE FOR VIEWING PURPOSES

BACKGROUND OF THE INVENTION

1. Field of the Invention

The present invention relates to a trailer guide with an elevatable tube for viewing, and more specifically, pertains to guiding a driver who is attempting to back up a vehicle that has an empty trailer attached. Such a trailer is too low to see from the drivers seat of the vehicle.

2. Description of the Prior Art

The use of aids for drivers of various designs and configurations is known in the prior art. More specifically, aids for drivers of various designs and configurations heretofore devised and utilized for the purpose of assisting drivers of vehicles with trailers are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. 3,863,594 to Gawthrop a boat trailer backup guide which enables the driver of a towing vehicle to observe the position of the trailer when there is no boat thereon.

U.S. Pat. No. 4,209,279 to Aasen discloses a boat trailer towing guide which maintains a centering and guiding force on the low hull as it is moved on the guide rollers through a winch and cable system associated with the trailer.

U.S. Pat. No. 4,715,768 to Capps discloses a boat trailer guide which allows the rollers to float upwards as the boat trailer is backed into the water.

U.S. Pat. Nos. 4,836,569 and 5,076,603 to Godbersen discloses a load guide for a boat trailer which includes a post load guide and a boat trailer guide unit, respectively.

Lastly, U.S. Pat. No. 5,195,767 to Des Roches discloses telescoping, extending guide rails for use with boat trailers.

In this respect, the trailer guide with an elevatable tube for viewing purposes according to the present invention substantially departs from the conventional concepts and designs of the prior art, and in so doing provides an apparatus primarily developed for the purpose of guiding a driver who is attempting to back up a vehicle with an empty trailer attached. Such a trailer may be used to haul a boat, a jet-ski, a snowmobile or other cargo. When the cargo is not on the trailer, the trailer is too low to see from the drivers vehicle.

Therefore, it can be appreciated that there exists a continuing need for a new and improved trailer guide with an elevatable tube for viewing purposes which can be used to guide a driver who is attempting to back up a vehicle that has an empty trailer attached. In this regard, the present invention substantially fulfills this need.

SUMMARY OF THE INVENTION

In view of the foregoing disadvantages inherent in the known types of aids for drivers of various designs and configurations now present in the prior art, the present invention provides an improved trailer guide with an elevatable tube for viewing purposes. As such, the general purpose of the present invention, which will be described subsequently in greater detail, is to provide a new and improved trailer guide with an elevatable tube for viewing purposes and method which has all the advantages of the prior art and none of the disadvantages.

To attain this, the present invention essentially comprises a new and improved trailer guide with an elevatable tube for viewing purposes. An L-shaped bracket with a bend forms a fowardly extending leg and a rearward leg positionable in a vertical orientation secured to the framework of a trailer at the central extent of the rearmost transverse member. The bracket is permanently secured thereto. A pivot pin has a fixed end secured to the forwardly extending portion of the bracket. A resilient C-shaped clip with a central extent and a front opening is secured to the forwardly extending portion of the bracket at a forward extent of the bracket. Another resilient C-shaped clip with a central extent and a front opening is secured to the rearward vertically orientated leg at an upper extent of the bracket. A rigid elongated tube has an aperture adjacent to its lower end pivotally received on the pin and adapted to be moved from a lower horizontal orientation and a raised vertical orientation. The tube is adapted to be received within the clips when in either orientation and to remain in that orientation until moved by an external force applied as by a user.

There has thus been outlined, rather broadly, the more important features of the invention in order that the detailed description thereof that follows may be better understood and in order that the present contribution of the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in other ways. Also, it is to be understood that the phraseology and terminology employed herein are for the purpose of descriptions and should not regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved trailer guide with an elevatable tube for viewing purposes which has all the advantages of the prior art aids for drivers of various designs and configurations and none of the disadvantages.

It is another object of the present invention to provide a new and improved trailer guide with an elevatable tube for viewing purposes which which may be easily and efficiently manufactured and marketed.

It is another object of the present invention to provide a new and improved trailer guide with an elevatable tube for viewing purposes which is of a durable and reliable construction.

It is a further object of the present invention to provide a new and improved trailer guide with an elevatable tube for viewing purposes which can be easily operated by a user.

An even further object of the present invention to provide a new and improved trailer guide with an elevatable tube for viewing purposes which is susceptible of a low cost of manufacture with regard to both materials and labor, and which accordingly is then susceptible of low prices of sale to the consuming public, thereby making such aids for drivers of various designs and configurations economically available to the buying public.

Still yet another object of the present invention to provide a new and improved trailer guide with an elevatable tube for viewing purposes which provides in the apparatuses and methods of the prior art some of the advantages thereof, while simultaneously overcoming some of the disadvantages normally associated therewith.

Even still another object of the present invention to guide a driver who is attempting to back up a vehicle that has an empty trailer attached.

Lastly, it is an object of the present invention to provide an apparatus for use with a trailer comprising of an L-shaped bracket with a bend forming a fowardly extending leg and a rearward leg positionable in a vertical orientation secured to the framework of a trailer at the central extent of the rearmost transverse member. The bracket is permanently secured thereto. A pivot pin has a fixed end secured to the forwardly extending portion of the bracket. A resilient C-shaped clip with a central extent and a front opening is secured to the forwardly extending portion of the bracket at a forward extent of the bracket. Another resilient C-shaped clip with a central extent and a front opening is secured to the rearward vertically orientated leg at an upper extent of the bracket. A rigid elongated tube has an aperture adjacent to its lower end pivotally received on the pin and adapted to be moved from a lower horizontal orientation and a raised vertical orientation. The tube is adapted to be received within the clips when in either orientation and to remain in that orientation until moved by an external force applied as by a user.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
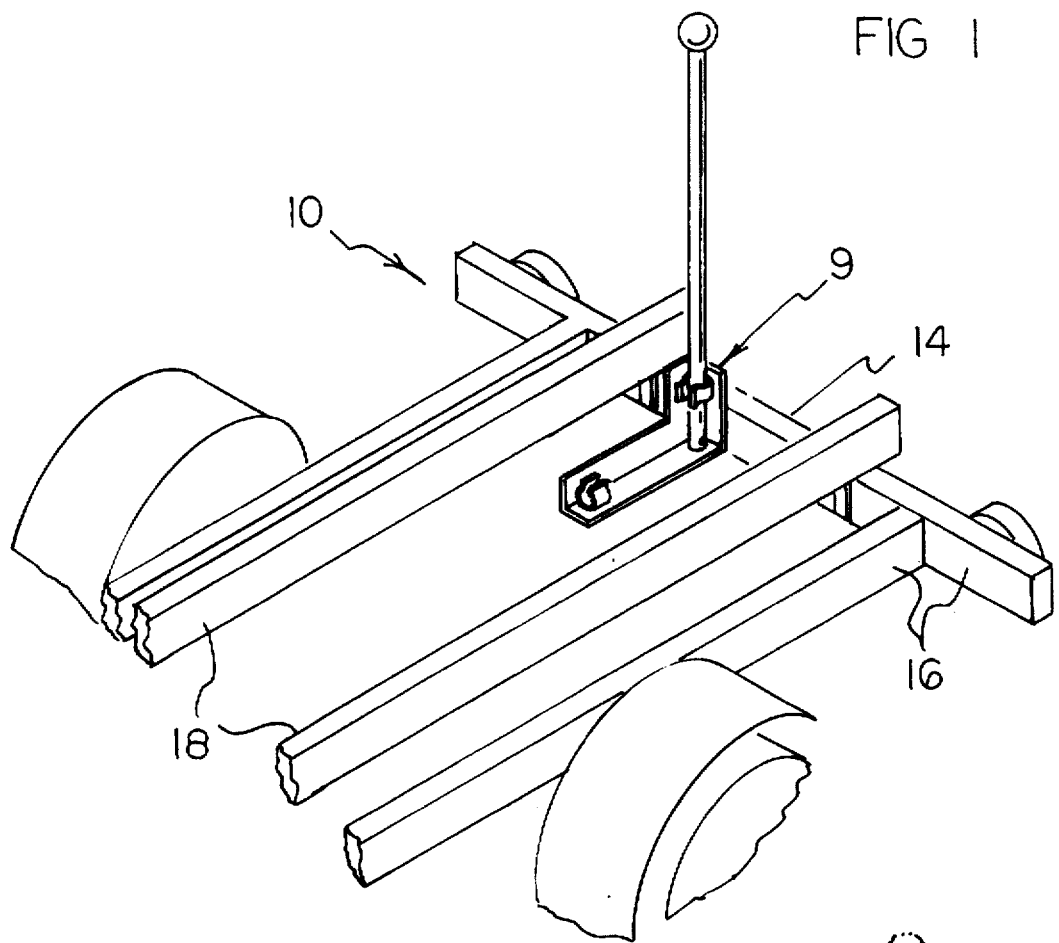
FIG. 1 is a perspective illustration of the preferred embodiment of the new and improved trailer guide with an elevatable tube for viewing purposes constructed in accordance with the principles of the present invention.

With reference now to the drawings, and in particular to FIG. 1 thereof, the preferred embodiment of the new and improved trailer guide with an elevatable tube for viewing purposes embodying the principles and concepts of the present invention and generally designated by the reference numeral 9 will be described.

The present invention, the new and improved trailer guide with an elevatable tube for viewing purposes, is a system 9 comprised of a plurality of components. In their broadest context, the components include a bracket, a pivot pin, two resilient C-shaped clips and a rigid elongated tube member along with common hardware for attaching to a frame member. Each of the individual components is specifically configured and correlated, one with respect to the other, so as to achieve the desired objectives.

More specifically, the present invention is a system which is attached to a trailer 10. Such a trailer has a forward end which is readily attachable to a vehicle in the conventional manner. The trailer extends rearwardly from the forward end. In addition, the trailer has a rectangular frame 16 with central longitudinal components 18 and transverse components 14. Such longitudinal and transverse components are for supporting a boat or jet-ski or similar device thereon for transportation purposes.

Secured with respect to the trailer 10 is an L-shaped bracket 9. The bracket (shown enlarged in FIG. 2) is provided with a forwardly extending portion 29 and a rearwardly extending portion 24. The rearwardly extending portion is secured to the framework of the trailer with bolts through holes 25. This securement is adjacent to the rear transverse member of the frame but extending forwardly thereof. In this manner the bracket is essentially secured thereto in a permanent fashion. Within the rearwardly extending portion of the bracket is a transverse pivot pin 30. The pivot pin has one end fixedly secured in an aperture located in the bracket.

The next component of the apparatus is a resilient C-shaped clip 34. Such clip has a rear central extent and a front opening. The clip is secured at its rear to a central extent of the rearwardly extending portion of the bracket.

The next component of the apparatus is another resilient C-shaped clip 35. Such clip has a rear central extent and a front opening. The clip is secured at its rear to a central extent of the forwardly extending portion of the bracket.

Figure 2:
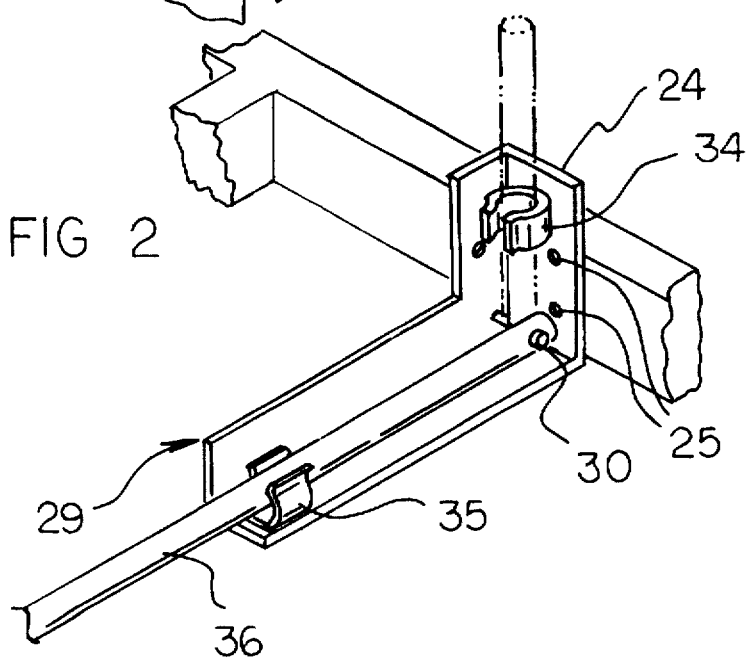
FIG. 2 is an enlarged perspective view of a portion of the device shown in FIG. 1 but with the pole in the lowered position.

Lastly provided on the bracket is a rigid elongated tubular member 36. Such tubular member has an aperture extending through its diameter adjacent to its lower end. This allows the tube member to be pivotally received on the pin. The tube is adapted to be moved from a lower horizontal orientation as shown in FIG. 2 to a raised orientation as shown in FIG. 1 or in the dotted line showing of FIG. 2.

The tube or pole is adapted to be received within clip 35 when in the lowered orientation. It remains there by the resilient nature of the clip wherein it will stay in such lower horizontal orientation facing forwardly until pulled upwardly by an external force as by a user to raise the pole into an elevated operative position for being viewed. While in the elevated operative position the pole is received within clip 34. It remains there by the resilient nature of the clip in a vertical orientation until it is pushed downward by an external force.

Figure 3:
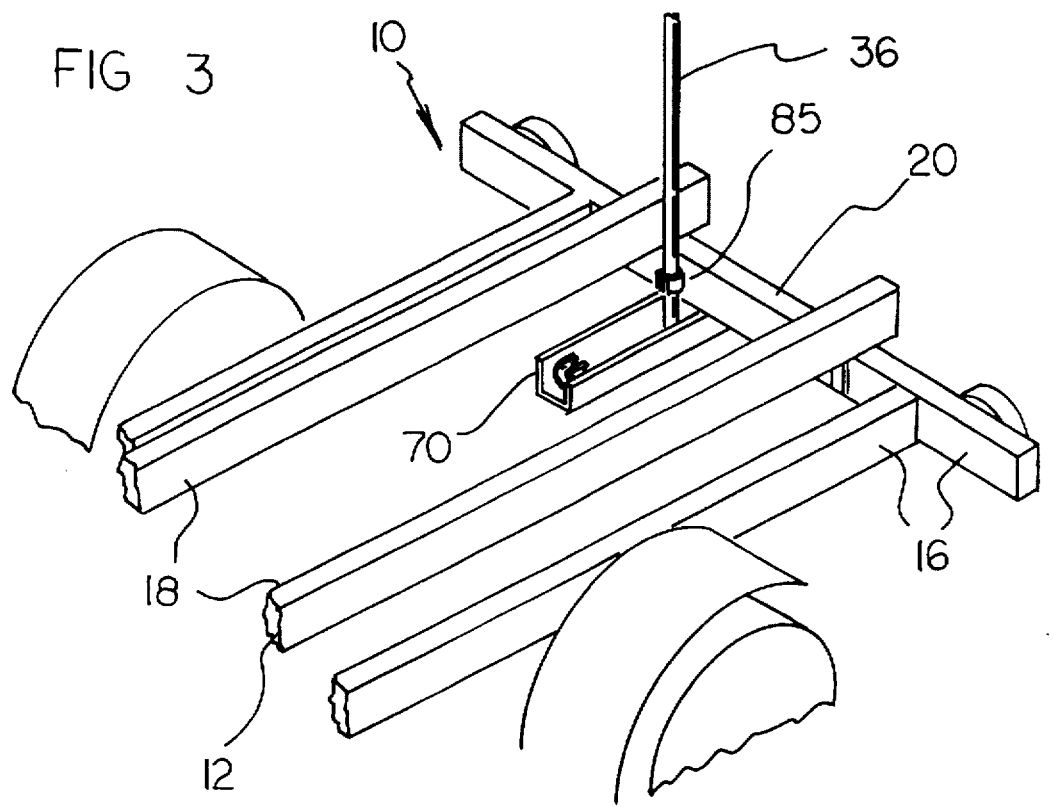
FIG. 3 is a perspective illustration of an alternate embodiment of the invention.
Figure 4:
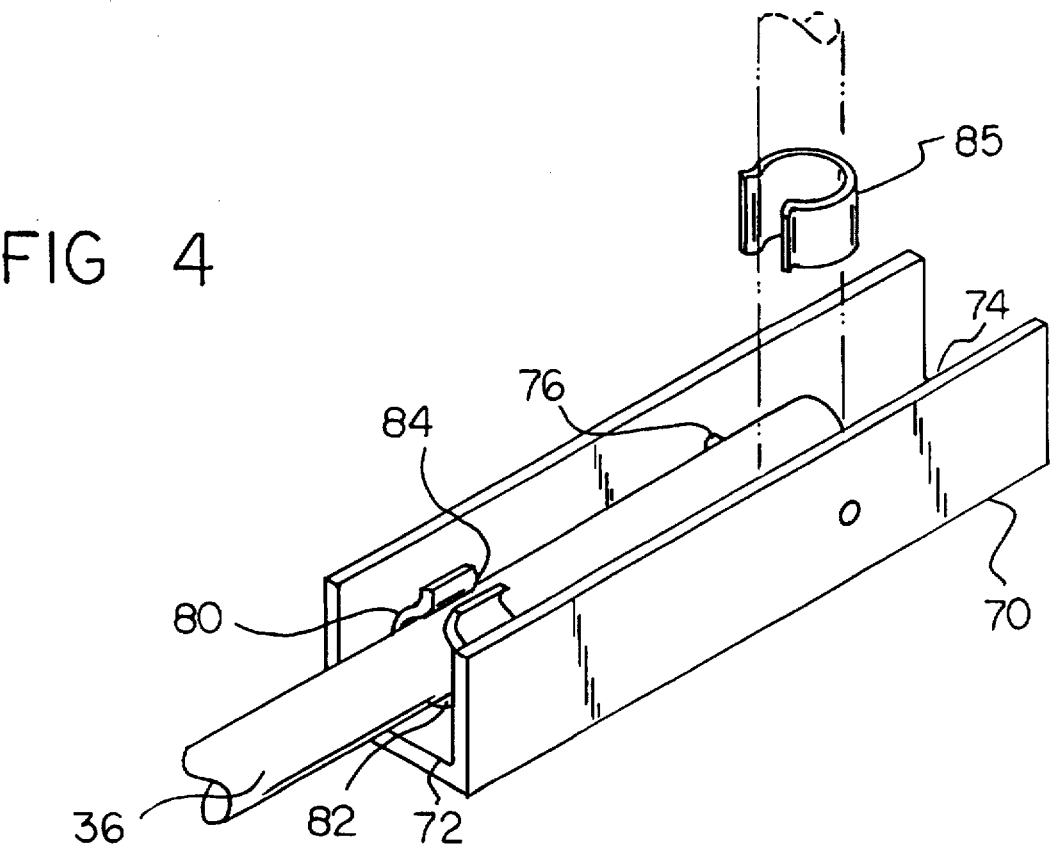
FIG. 4 is an enlarged perspective view of the device shown in FIG. 3 but with the pole in the lowered position.

An alternate embodiment is shown in FIGS. 3 and 4. In such embodiment, the trailer has a transverse rear component 20. Secured with respect to the trailer 10 is a U-shaped bracket 70. The U-shaped bracket is provided with a forwardly extending portion 72 and a rearwardly extending portion 74. The rearwardly extending portion is secured to the framework of the trailer. It is preferably mounted with its upper surface welded to the bottom of the trailer frame at the middle of the rearmost transverse member. This is adjacent to the rearmost member but forwardly thereof. In this manner, the bracket is essentially secured thereto in a permanent fashion beneath the frame. Within the upwardly extending sides of the U-shaped bracket is a transverse pivot pin 76. The pivot pin has opposite ends fixedly secured in apertures located in a central extent of the parallel sides of the U-shaped bracket.

The next components of the apparatus are resilient C-shaped clips 80 and 85. Each clip has a central extent and a front opening. Clip 80 is secured at its central extent to the forwardly extending portion of bracket 70 between the parallel sides. The clip 85 is secured at its central extent to the forwardly face of the rearmost transverse crossmember directly above and in line with the center of bracket 70.

Lastly provided on the bracket 70 is a rigid elongated tubular member 36 as in the previous embodiment. Such tubular member has an aperture extending through a diameter thereof adjacent to its lower end. This allows the tube member to be pivotally received on pin 76. It is also adapted to be moved from a lower horizontal orientation as shown in FIG. 4 to a raised operative vertical orientation as shown in FIG. 3 and in the dotted line showing of FIG. 4.

The pole is adapted to be received within the clip 80 when in the lowered orientation. It remains by the resilient nature of the clip wherein it will stay in such lower essentially horizontal orientation facing forwardly until pulled upwardly by an external force as by a user to raise the pole into an elevated operative position for being viewed. When in the raised position, it will be received into clip 85 where it will remain until pushed downward by an external force as by a boat pulling onto the trailer.

The present invention comprises a pole that stands up at the back of an empty trailer, such as one used to haul a boat, jet-ski or other cargo, that will guide a driver who attempts to back up a vehicle with such trailer attached.

The pole is made of tubing and is pinned near the bottom of a channeled bracket. This bracket is attached to the rear of the trailer. The bracket supports the pole in a vertical position for visibility to the driver. The bracket also acts to store the pole in a lowered horizontal position when not being used. C-shaped clips hold the pole in either position. The pole is brightly painted or fitted with a bright object making it easily visible to the driver.

When a vehicle with an empty trailer attached, such as one retrieving a boat from a lake, is backed up, the trailer is not visible to the driver, making it difficult to back up straight. The erected pole extends high enough to show the driver exactly where the trailer is in relation to the vehicle. This will ensure the trailer can be backed up much more easily.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the present invention.

What is claimed as being new and desired to be protected by LETTERS PATENT of the United States is as follows:

1. A new and improved trailer guide with an elevatable tube for viewing purposes comprising, in combination:

an attachment to a trailer; the trailer having a forward end attachable to a vehicle and a rearward end extending rearwardly therefrom; the trailer having a rectangular frame with central longitudinal components and transverse components for supporting a boat;

an L-shaped bracket with a forwardly extending portion and a rearwardly extending portion secured to the framework of the trailer adjacent to the rear end at a central extent of the rearmost transverse component thereof, the bracket being permanently secured thereto;

a pivot pin having one fixed end secured to the forwardly extending portion of the bracket;

two resilient C-shaped clips with a rear central extent and a front opening; one secured to the forwardly extending portion of the bracket at the forward extent; the other secured to the rearwardly extending portion of the bracket at the upper extent; and a rigid elongated tube having an aperture adjacent to its lower end, pivotally received on the pin and adapted to be moved from a lower horizontal orientation and a raised vertical orientation, the tube adapted to be received within the one clip when in the lowered orientation and retained in such orientation until pulled upwardly by an external force applied as by a user; the tube is also adapted to be received in the other clip when in the raised operative orientation and to remain there to be viewed until pushed forwardly by an external force applied as by a user.

2. Apparatus for use with a trailer comprising:

a bracket with a forwardly extending portion and a rearwardly extending portion securable to the framework of a trailer adjacent to the rearmost transverse component facing a forwardly direction;

a pivot pin having fixed ends secured to the bracket;

a first resilient C-shaped clip with a central extent and a front opening secured to the forwardly extending portion of the bracket;

another resilient C-shaped clip with a central extent and a front opening secured to the forward side of the rearmost transverse component of the trailer at its central point directly above and in line with the secured bracket; and a rigid elongated tube having an aperture adjacent to its lower end, pivotally received on the pin and adapted to be moved from a lower horizontal orientation and a raised vertical orientation, the tube adapted to be received within the first clip when in the lowered orientation and retained in such orientation until pulled upwardly by an external force applied as by a user; the tube is also adapted to be received in said another clip when in the raised operative orientation and to remain there to be viewed until pushed forwardly by an external force applied as by a user.

3. The apparatus as set forth in claim 2 wherein the bracket is of a U-shaped configuration with the forwardly extending portion and rearwardly extending portion in an essentially horizontal plane.

4. The apparatus as set forth in claim 1 wherein the bracket has the rearwardly extending portion extending in a vertical orientation at right angles to the forwardly extending portion.

* * * * *